Dec. 29, 1942.   C. M. JOHNSON   2,306,699
COMBINED TANK FILLER AND CAP
Filed May 22, 1940
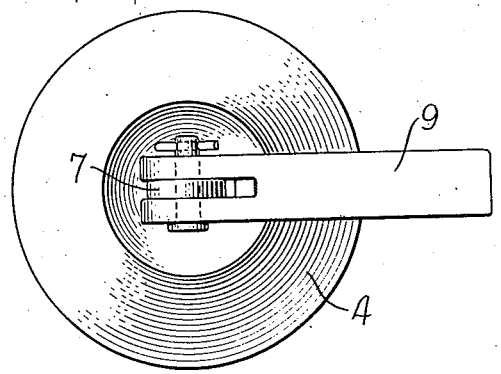
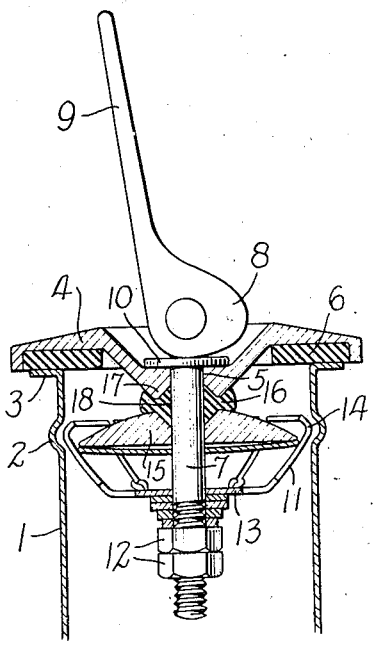
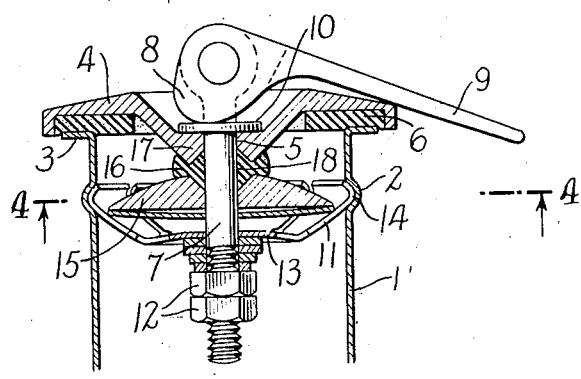
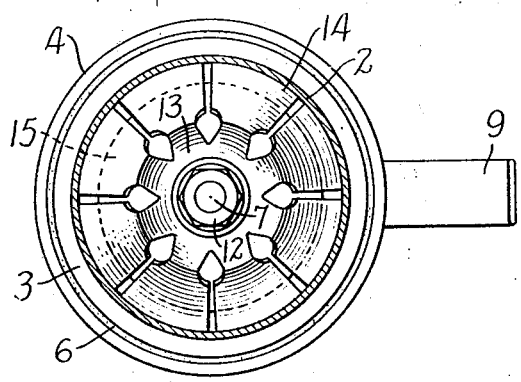
INVENTOR
Corydon M. Johnson
BY
Blair, Curtis & Hayward
ATTORNEYS Patented Dec. 29, 1942

2,306,699

UNITED STATES PATENT OFFICE 2,306,699

COMBINED TANK FILLER AND CAP

Corydon M. Johnson, Freeport, N. Y.

Application May 22, 1940, Serial No. 336,522

2 Claims. (Cl. 220—25)

This invention relates to a tank filler and cap such for instance as may be used on gasoline storage tanks of aeroplanes. An object of the invention resides in the provision of a filler and cap wherein the cap may be easily attached to and detached from the filler and when attached to the filler will not accidentally become detached therefrom, and will prevent the leakage or seepage of the gasoline or other fluid from the filler and consequently from the storage tank.

In the drawing:

Figure 1 is a top plan view of the device;

Figure 2 is a vertical sectional view partly broken away showing the filler cap in its closed position;

Figure 3 is a similar view showing the cap in its unlocked position and before removal;

Figure 4 is a bottom view taken from the inside of the filler.

In the form of the invention illustrated in the drawing the filler consists of a pipe 1 having an annular groove 2 therein adjacent its end. The end of the filler is preferably overturned to form a flange 3.

The cap includes a closure 4 that has a central opening 5 and a sealing ring 6, such as rubber or other expansible or compressible material, which is adapted to rest upon the flange 3.

There are two possibilities of escape of the fluid from the filler 1, one is through the central opening 5 of the closure and the other through the joint between the sealing ring 6 and the flange 3.

In order that both of these avenues of escape may be sealed and the closure tightly held in place on the filler, I have provided a central shaft 7 that extends through the opening 5 of the closure and to the upper end of which is pivoted a cam 8 having an operating lever 9 thereon which cam is adapted to operate against a plate 10 on the closure 4 to draw the shaft 7 upwardly, that is toward the open end of the filler, and permit it to move downwardly in the opposite direction.

A locking element which is generally circular in plan and includes a plurality of outwardly extending resilient fingers 11 is loosely mounted on the shaft 7 and is adjustably held in position by suitable means 12. The base 13 of this locking element is slightly concavo-convex and the fingers 11 extend upwardly from this base having flanges 14 on their ends for engagement in the groove 2 of the filler 1. In order that these fingers may be spread to resiliently grip in this groove 2 to draw the closure tightly into contact with the filler so that a compressive action occurs between the sealing ring 6 and the flange 3 and so that the closure will be positively held in this sealing position, I have provided a spreader cam 15 which is loosely mounted on the shaft 7, and have interposed a resilient and compressible washer 16 between the neck 17 of the closure 4 and the spreader cam 15. It will be noted that this neck 17 and also the spreader cam 15 have complemental cam surfaces 18 for engaging the washer 16.

When the parts are in the position shown in Figure 3 with the operating cam 8 in its inoperative position the flanges 14 on the ends of the fingers 11 will be out of engagement with the grooves 2, and there will be no pressure exerted on these fingers by the spreader cam 15. The sealing ring 6 will entirely engage the flange 3 on the upper end of the filler and the sealing ring 16 will not be under compression.

When, however, the operating cam is moving into the position shown in Figure 2, the shaft 7 will be drawn upwardly at the same time the closure 4 will, because of pressure exerted by the cam 8, be moved downwardly. Thus there will be relative movement of the locking element carrying the fingers 11 and the closure 4. This relative movement will cause the expansion of the fingers 11 of the locking element so that the flanges on the end thereof will be forced into the groove 2 of the filler. Thus the entire cap will be immediately locked in position on the filler and because of this locking action the sealing ring 6 of the closure 4 will be drawn into tight contact with the flange 3 to prevent the escape of fluid. At the same time the relative movement of the closure 4 and the locking element will, through the action of the cams 18, impress the sealing ring 16 against the shaft 7 and against themselves so as to prevent the escape of any fluid around the shaft.

Of course the degree of the force exerted by the fingers 11 in their locking action may be varied by the adjustment of the nuts 12 to increase or decrease the action of the spreader cam 15.

When it is desired to unlock and remove the cap it is only necessary to move the operating cam 8 into the position shown in Figure 3, which may be done by a simple flip of the handle lever 9 by either the ungloved or gloved hand of the operator.

While I have illustrated and described the particular form of my inveniton, it is of course to be understood that changes may be made in the details of construction without departing from the spirit of the invention or exceeding the scope of the claims.

What I claim is:

1. The combination with a tubular filler having an open end of a closure cap for said open end, a shaft extending freely through the closure cap and having an abutment on its end within the filler, a radially expansible locking member supported by said abutment, a substantially circular cam freely carried by the shaft and supported by the expansible locking member, a compressible washer interposed between the closure cap and the cam and surrounding the shaft, the lower face of the closure cap and the upper face of the cam having oppositely arranged frustoconical recesses whose axes are coincident with the axis of the shaft adapted to engage the upper and lower faces of the washer, and means for drawing the closure cap, the expansible locking member and the cam toward each other to expand the locking member against the inner wall of the filler and to force the washer into tight sealing engagement with the shaft.

2. The combination with a tubular filler having an open end of a closure cap for said open end, a shaft extending freely through the closure cap and having an abutment on its end within the filler, a radially expansible locking member supported by said abutment, a substantially circular cam freely carried by the shaft and supported by the expansible locking member, a compressible washer interposed between the closure cap and the cam and surrounding the shaft, the lower face of the closure cap and the upper face of the cam having faces inclined in respect of the shaft and in opposite directions in respect of each other adapted to engage the upper and lower surfaces of the washer.

CORYDON M. JOHNSON.